April 27, 1954          K. L. DIEHL          2,676,515
PROJECTING PRESSURE INDICATING INSTRUMENT
Filed March 30, 1951          2 Sheets-Sheet 1
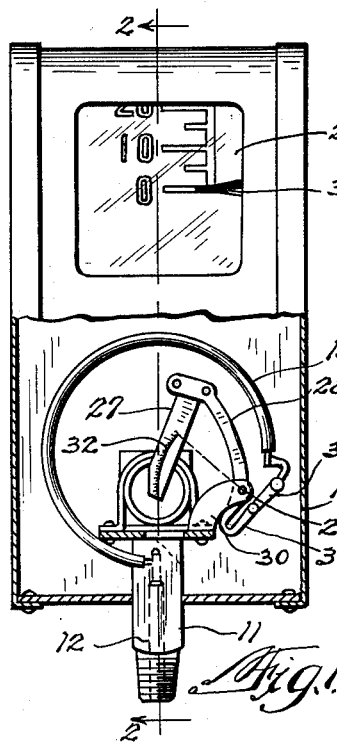
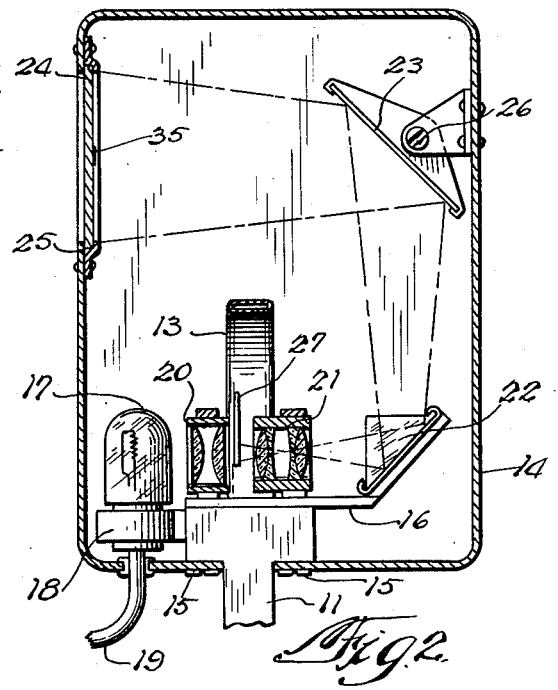
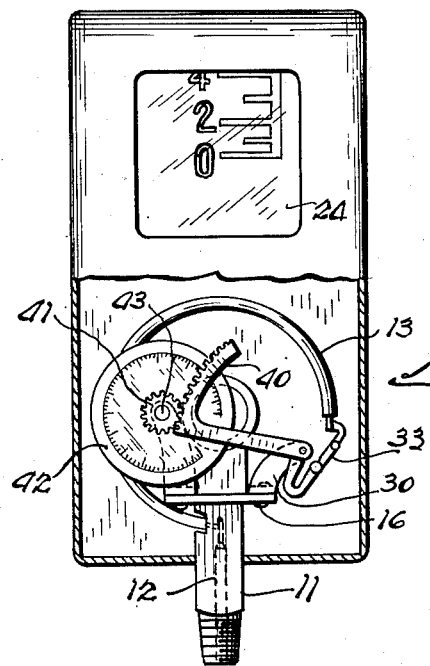
INVENTOR.
Karl L. Diehl April 27, 1954 K. L. DIEHL 2,676,515
PROJECTING PRESSURE INDICATING INSTRUMENT
Filed March 30, 1951 2 Sheets-Sheet 2
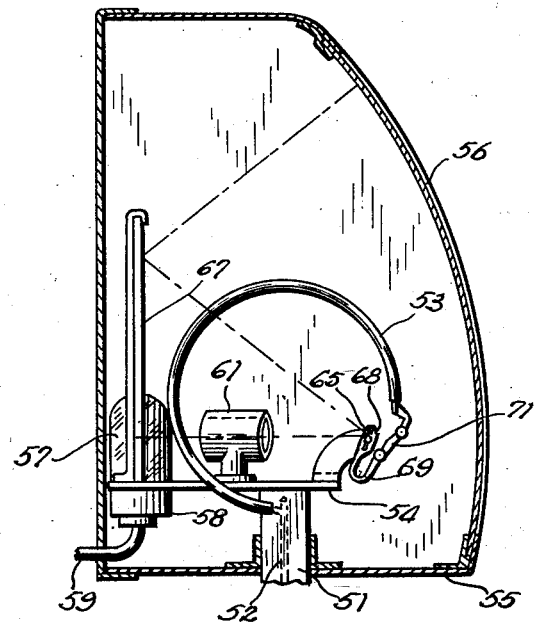
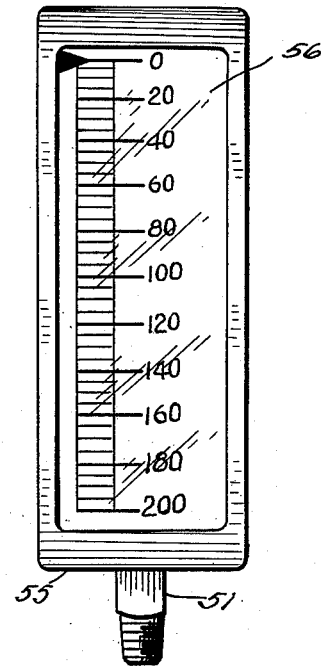
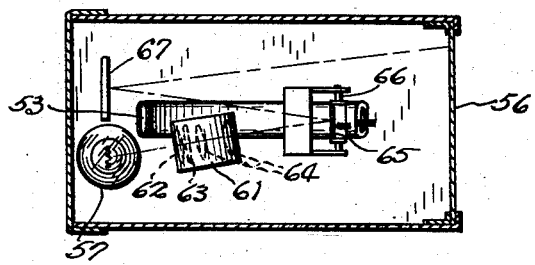
INVENTOR.
Karl L. Diehl.

Patented Apr. 27, 1954

2,676,515

UNITED STATES PATENT OFFICE 2,676,515

PROJECTING PRESSURE INDICATING INSTRUMENT

Karl L. Diehl, Chicago, Ill., assignor to Jas. P. Marsh Corporation, Skokie, Ill., a corporation of Illinois Application March 30, 1951, Serial No. 218,498

5 Claims. (Cl. 88—24)

The present invention relates to indicating instruments, such as pressure gauges and thermometers, and has special reference to such instruments in which a Bourdon tube, a diaphragm, or a bellows is employed as the operating element.

More particularly, this invention relates to indicating instruments having optical means for projecting the instrument reading, greatly enlarged, on a screen.

The present invention may include a movable transparent member having a scale or other indicia thereon connected to the actuating member of the instrument, such as a Bourdon tube. The scale member is positioned to be moved across the axis of a projector system which enlarges and projects on a screen having a pointer painted or otherwise formed thereon an image of that portion of the scale positioned at the axis of the projector system.

In another form the image of a pointer is projected on a large screen having a scale or other indicia thereon, by a projector system including a movable mirror connected to the free end of a Bourdon tube or other instrument-actuating member, whereby movement of the mirror responsive to movement of the actuating member controls the positioning of the pointer image on the screen. Either form of instrument can be readily regulated by merely adjusting a mirror in the optical system.

With a gauge of this type the friction of gears and other moving parts may be substantially eliminated along with the mass effect of the pointer and the other moving parts. The reading is not only enlarged but is extremely accurate irrespective of the angle of observation. This is due to the fact that the pointer mark is preferably directly on the screen. If desired, the instrument reading can be projected on a surface at a distance from the instrument, or the beam of light may be used to influence an element such as an electric eye and thereby control other mechanism.

An object of the present invention is to provide an indicating instrument having indicating means including an optical system.

Another object of the invention is to provide an indicating instrument of the above type in which the instrument reading is enlarged and projected on a screen.

A further object of the invention is to provide such a device which may be readily and accurately adjusted.

An additional object is to provide an indicating instrument of high accuracy in which friction and the mass effect of the moving parts thereof are substantially eliminated.

Still another object is to provide an indicating instrument which can be accurately read from any angle of observation.

A still further object is to produce an instrument which may project the reading thereof on a distant surface or may be employed to control a recorder, regulator, or other desired apparatus.

Further objects and advantages will be apparent from the following description and claims when considered with the accompanying drawings, in which:

Fig. 1 is a front elevational view of an indicating instrument embodying the present invention having an optical projecting system as a part thereof;

Fig. 2 is a central, vertical, cross-sectional view taken on the line 2—2 of Fig. 1;

Fig. 3 is a view similar to that of Fig. 1 showing a modified form of instrument;

Fig. 4 is a vertical cross-sectional view, partially in elevation, of still another form of instrument embodying the present invention;

Fig. 5 is a front elevational view of the instrument shown in Fig. 4; and

Fig. 6 is a horizontal cross-sectional view, partly in elevation, of the instrument shown in Figs. 4 and 5.

Referring to the drawings, and particularly to Figs. 1 and 2, there is shown an instrument having indicating means including an optical projector system embodying the present invention.

The particular instrument illustrated is a pressure gauge comprising a post 11 having a longitudinal passageway 12 therein for communicating with a source of pressure, and a Bourdon tube 13 connected to the post and in communication with the passage 12. The instrument is preferably enclosed in a casing 14 provided at the bottom with a suitable opening for receiving the lower end of the post 11 therein. As shown in Fig. 2, the upper end of the post 11 is enlarged and is fixedly secured to the casing 14 by screws 15.

A platform 16 is secured on the upper end of the post 11 and supports at least part of the optical projector system of the instrument. This system may comprise a source of light 17, such as an incandescent lamp, mounted in a receptacle 18 secured at one end of the enlarged portion of the post 11. A lead 19 supplies energy to the receptacle 18.

In line with the light source are condensing lenses 20 and project lenses 21. Light from the lamp 17 after passing through the condensing lenses 20 and the project lenses 21 is reflected by a prism 22 or a mirror to a second reflecting member, such as a mirror 23, and from there is projected onto a suitable screen 24 positioned in the opening 25 in the front of the casing 14. Due to the distance of the screen 24 from the project lenses 21, the beam of light diverges materially before striking the screen 24. The mirror 23 is preferably adjustably mounted about a pivot 26 whereby the position of the beam of light from the lamp 17 may be controlled with respect to the screen 24.

Positioned between the condensing lenses 20 and the project lenses 21 is a transparent scale member 27 fixed to an arm 28 pivoted at 29 between a pair of supports 30 mounted on the platform 16. The lower end of the arm 28 is in the shape of a gooseneck 31. Formed on the transparent scale 27, preferably by opaque marking, are indicia, such as a scale 32, which, in the instrument described, indicates pounds pressure. The scale 32 is arcuate shaped, having the curvature of a circle the center of which is located at the pivot 29. The arm 28 and transparent member 27 are so positioned that a portion of the scale will always lie at the optical axis of the projector system. A link 33 is pivoted at one end to the gooseneck 31 of the lever 28, and at the other end to the free end of the Bourdon tube 13. With this construction movement of the free end of the Bourdon tube, due to changes in pressure therein, will cause the arm 28 to pivot about the axis 29 to move the scale 32 through the axis of the optical system. If desired, the scale member can be mounted directly on the end of the Bourdon tube, and the optical system arranged to project its image on the screen.

When the lamp 17 is energized, light therefrom will pass through the condensing lenses 20, the transparent scale 27 and the projection lenses 21 to the reflecting members 22 and 23, being projected from the latter onto the screen 24. An indicator 35 is fixed to the screen 24 preferably by being adhesively secured thereto or painted thereon. The indicator 35 is shown as being positioned at one side of the screen 24 midway between the top and bottom thereof.

The transparent scale member 27 and arm 28 are originally positioned so that with no pressure in the system the zero end of the scale will be at the optical axis of the projecting system. However, if the zero marking on the scale does not appear on the screen opposite the pointer 35, this may be corrected by pivoting the mirror 23 about the pivot 26, thereby providing a very simple and accurate adjustment for the device.

As pressure increases in the Bourdon tube, the tube will tend to straighten out, pivoting the arm 28 about its pivot 29 and moving portions of the scale into the axis of the system so that those parts of the scale will then appear on the screen 24.

A device as above described is substantially frictionless as little movement is involved and there are very few moving parts. The instrument reading projected on the screen 24 is quite large and may be accurately read from any angle of observation, as both the image of the scale and the pointer 35 are preferably directly on the screen 24.

A modified form of device is disclosed in Fig. 3 which is in many respects similar to that shown in Figs. 1 and 2. It also comprises a post 11 with a longitudinal passageway 12 therein for connection to a source of pressure and to a Bourdon tube 13. However, the link 33, although connected at one end to the Bourdon tube 13, is connected at the opposite end to a section 40 in mesh with a pinion 41 secured to a preferably circular, transparent scale member 42 having opaque indicia thereon. The scale member 42 rotates about a shaft 43 which is so positioned that the scale will pass through the optical axis of the optical projector system when rotated by movement of the Bourdon tube 13. The projector system employed in the modification shown in Fig. 3 may be the same as that employed in the instrument illustrated in Figs. 1 and 2. Obviously, changes in the optical system may be made while still projecting the instrument reading on the screen 24.

The construction illustrated in Fig. 3 is particularly suitable where it is desired to have a greatly enlarged scale projected on the screen. As the movement of the Bourdon tube is multiplied by the sector 40 and the pinion 41, the scale on the member 42 may be much larger than the scale 32 employed in the form of device shown in Fig. 1. Accordingly, although a smaller portion of the entire scale on the member 42 will be projected on the screen, that portion will appear to be enlarged to a greater extent than in the device of Fig. 1.

Referring to Figs. 4, 5 and 6, a further modification of the present invention is disclosed. The instrument again is illustrated as including a post 51 having a longitudinal passageway 52 therein for connection to a source of pressure. A Bourdon tube 53 is connected to the post in communication with the passage 52. The optical system is supported, at least in part, on a platform 54 secured on the upper end of the post 51. The instrument is enclosed within a casing 55 provided with a long, preferably arcuate, screen 56 having a scale or other indicia arranged thereon.

The optical system illustrated comprises a light source, such as an incandescent lamp 57, mounted in a receptacle 58 and connected to a source of energy by leads 59. A tubular member 61 mounted on the platform 54 and aligned with the light source 57 contains a condensing lens 62, a transparent screen 63 having thereon a preferably opaque pointer mark or indicator, and project lenses 64. Also aligned with the tubular member 61 is a mirror 65 pivotally mounted about a horizontal transverse axis 66. A relatively elongated, vertically-arranged mirror or other reflecting member 67 is positioned to receive light from the source 57 reflected by the mirror 65 and to project it onto the screen 56.

The mirror 65 is mounted in a support 68 which rotates about the horizontal pivot 66. A gooseneck 69 on the end of the support 68 is connected to the free end of the Bourdon tube 53 by a link 71 pivoted to both the gooseneck 69 and the Bourdon tube. The mirror support 68 is originally so positioned that when the pressure in the instrument is zero, light from the lamp 57 passing through the lenses 62 and 64 and the transparent member 63 having the opaque pointer mark thereon, will cause the image of the pointer to be projected on the screen at the zero mark of the scale. As the free end of the Bourdon tube tends to straighten out due to an increase in pressure, the mirror 65 is pivoted to reflect the light more nearly in a horizontal direction to move the pointer image a distance down the scale from the zero position, depending upon the amount of the pressure increase.

The curvature of the arcuate screen 56 is preferably such that the light travels a constant distance from the light source to the screen irrespective of the position on the screen of the pointer image. To accomplish this, the arc of the screen has the curvature of a circle the radius of which is equal to the distance from the screen to an imaginary center point horizontally aligned with the mirror 65 and located the same distance to the rear of the reflecting surface of the mirror 67 as the mirror 65 is to the front of said reflecting surface.

An instrument such as shown in Figs. 4–6 can also be constructed to provide a uniformly graduated scale, although the actuating element of the instrument does not move proportionately to changes in pressure, such as in vapor-pressure-operated dial thermometers. This may be accomplished in the present device by tilting the mirror 67 forwardly or rearwardly so that the distance of travel of light from the source to the screen changes with every position of the mirror 65, or by suitably changing the curvature of the screen 56, or by both.

With an instrument embodying the present invention, a very accurate enlarged reading may be obtained, and, if desired, the reading may be projected on a surface at a distance from the instrument. The light beam from the projector system may also be employed to operate or control other mechanism such as through the medium of an electric eye. Friction and the mass effect of moving parts may be substantially eliminated and the instrument may be very accurately and easily adjusted. Moreover, as both the pointer and the indicating indicia are on the scale, the scale may be accurately read at any angle of observation.

While particular embodiments of this invention have been illustrated and described, it will be understood of course that the invention is not to be limited thereto since many modifications may be made, and it is contemplated therefore by the appended claims to cover any such modifications as fall within the true spirit and scope of this invention.

I claim:

1. The combination with a pressure indicating instrument comprising a movable element responsive to pressure variation, of a pivotally mounted reflecting member connected to said pressure responsive element and pivoted by movement thereof, a light source arranged at one side of said reflecting member for directing a beam of light towards the reflecting surface thereof, an indicator located between said light source and reflecting member for causing an indicator image on said reflecting surface, a second reflecting member positioned to receive the image of said indicator reflected by said first reflecting member, a casing for enclosing said pressure responsive member, reflecting members, light source and indicator, said casing having an arcuate screen in one side thereof with pressure indicating indicia fixed thereon positioned to receive thereon the indicator image reflected from said reflecting members, and said screen having a curvature such that the distance of travel of light from said light source to the various parts of said screen upon pivoting of said first reflecting member is substantially constant.

2. The combination with a pressure indicating instrument comprising a movable element responsive to pressure variation, of a pivotally mounted reflecting member connected to said pressure responsive element and pivoted by movement thereof, a light source arranged at one side of said reflecting member for directing a beam of light towards the reflecting surface thereof, an indicator and lens located between said light source and reflecting member for causing an indicator image on said reflecting surface, a second reflecting member positioned to receive the image of said indicator reflected by said first reflecting member, a casing for enclosing said pressure responsive member, reflecting members, light source and indicator, said casing having an arcuate screen in one side thereof with pressure indicating indicia fixed thereon positioned to receive thereon the indicator image reflected from said reflecting members, and said screen having a curvature such that the distance of travel of light from said light source to the various parts of said screen upon pivoting of said first reflecting member is substantially constant.

3. The combination with a pressure indicating instrument comprising a movable element responsive to pressure variation, of a pivotally mounted reflecting member connected to said pressure responsive element and pivoted by movement thereof, a light source arranged at one side of said reflecting member for directing a beam of light towards the reflecting surface thereof, an indicator located between said light source and reflecting member for causing an indicator image on said reflecting surface, a second substantially planar reflecting member positioned to receive the image of said indicator reflected by said first reflecting member, a casing for enclosing said pressure responsive member, reflecting members, light source and indicator, said casing having an arcuate screen in one side thereof with pressure indicating indicia fixed thereon positioned to receive thereon the indicator image reflected from said reflecting members, and said screen having a curvature such that the distance of travel of light from said light source to the various parts of said screen upon pivoting of said first reflecting member is substantially constant.

4. The combination with a pressure indicating instrument comprising a movable element responsive to pressure variation, a pivotally mounted reflecting member connected to said pressure responsive element and pivoted by movement thereof, a light source arranged at the front side of said reflecting member for directing a beam of light towards the reflecting surface thereof, an indicator located between said light source and reflecting member for causing an indicator image on said reflecting surface, a second substantially planar reflecting member adjacent said light source positioned to receive the image of said indicator reflected by said first reflecting member, a casing for enclosing said pressure responsive member, reflecting members, light source and indicator, said casing having an arcuate screen in one side thereof to the rear of said reflecting member with pressure indicating indicia fixed thereon positioned to receive thereon the indicator image reflected from said reflecting members, said screen having a curvature such that the distance of travel of light from said light source to the various parts of said screen upon pivoting of said first reflecting member is substantially constant.

5. The combination with a pressure indicating instrument comprising a post having a passageway for connection to a source of pressure and a generally vertically arranged Bourdon tube connected at one end to said post, of a supporting structure mounted on said post, a pivotally mounted reflecting member connected to the free end of said Bourdon tube and pivoted by movement thereof, a light source arranged at the front side of said reflecting member in the general direction of the fixed side of said tube for directing a beam of light towards the reflecting surface thereof, an indicator and lens located between said light source and reflecting member for causing an indicator image on said reflecting surface, a second substantially planar reflecting member positioned toward the same side as said light source to receive the image of said indicator reflected by said first reflecting member, said light source, indicator and reflecting member being mounted on said supporting structure, a casing for enclosing said Bourdon tube, supporting structure, reflecting members, light source and indicator, said casing having an arcuate screen in one side thereof at the rear of said first reflecting member with pressure indicating indicia fixed thereon positioned to receive thereon the indicator image reflected from said reflecting members, said screen having a curvature such that the distance of travel of light from said light source to the various parts of said screen upon pivoting of said first reflecting member is substantially constant.

References Cited in the file of this patent
UNITED STATES PATENTS

| Number | Name | Date |
|---|---|---|
| 201,637 | Treat | Mar. 26, 1878 |
| 1,402,970 | Schaper | Jan. 10, 1922 |
| 1,456,847 | Geyer | May 29, 1923 |
| 1,562,936 | Ainsworth | Nov. 24, 1925 |
| 1,743,163 | Schaper | Jan. 14, 1930 |
| 1,761,947 | Wedin | June 3, 1930 |
| 1,928,001 | Aldeborgh et al. | Sept. 26, 1933 |
| 1,939,161 | Bestelmeyer | Dec. 12, 1933 |
| 2,068,390 | Sullivan | Jan. 19, 1937 |
| 2,172,166 | Lange | Sept. 5, 1939 |
| 2,373,989 | Wurger | Apr. 17, 1945 |
| 2,388,912 | Haferl et al. | Nov. 13, 1945 |